United States Patent
Abraham et al.

(10) Patent No.: US 8,442,544 B2
(45) Date of Patent: May 14, 2013

(54) METHOD AND SYSTEM FOR MITIGATING INTERFERENCE AMONG FEMTOCELLS VIA INTELLIGENT CHANNEL SELECTION

(75) Inventors: Charles Abraham, Los Gato, CA (US); Xuemin Sherman Chen, Rancho Santa Fe, CA (US); Wael William Diab, San Francisco, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 534 days.

(21) Appl. No.: 12/395,313

(22) Filed: Feb. 27, 2009

(65) Prior Publication Data
US 2010/0222069 A1 Sep. 2, 2010

(51) Int. Cl.
 *H04W 72/08* (2009.01)
(52) U.S. Cl.
 USPC ......... 455/452.2; 455/454; 455/453; 455/456
(58) Field of Classification Search ............... 455/452.2, 455/454, 453, 456.2, 456.3
See application file for complete search history.

(56) References Cited

U.S. PATENT DOCUMENTS

| | | |
|---|---|---|
| 2006/0209795 A1 | 9/2006 | Chow et al. |
| 2007/0121655 A1 | 5/2007 | Jin |
| 2008/0216145 A1 | 9/2008 | Barton et al. |
| 2008/0244148 A1 | 10/2008 | Nix, Jr. et al. |
| 2009/0042536 A1 | 2/2009 | Bernard et al. |
| 2009/0061873 A1 | 3/2009 | Bao et al. |
| 2009/0092081 A1 | 4/2009 | Balasubramanian et al. |
| 2009/0098858 A1 | 4/2009 | Gogic |
| 2009/0164547 A1 | 6/2009 | Ch'ng |
| 2009/0279430 A1 | 11/2009 | Huber et al. |
| 2009/0288144 A1 | 11/2009 | Huber et al. |
| 2009/0292799 A1 | 11/2009 | Eisener et al. |
| 2009/0316649 A1 | 12/2009 | Chen |
| 2010/0167734 A1 | 7/2010 | Jones et al. |
| 2010/0182991 A1 | 7/2010 | Abraham et al. |
| 2010/0184411 A1 | 7/2010 | Chen et al. |
| 2010/0184414 A1 | 7/2010 | Abraham et al. |

(Continued)

FOREIGN PATENT DOCUMENTS

WO 2007/000455 1/2007

OTHER PUBLICATIONS

Unpublished U.S. Appl. No. 12/391,009, filed Feb. 23, 2009.
Unpublished U.S. Appl. No. 12/395,470, filed Feb. 27, 2009.

(Continued)

*Primary Examiner* — David Q Nguyen
(74) *Attorney, Agent, or Firm* — Sterne, Kessler, Goldstein & Fox P.L.L.C.

(57) ABSTRACT

Aspects of a method and system for mitigating interference among femtocells via intelligent channel selection are provided. In this regard, signals which may interfere with cellular communications between a femtocell and a cellular communication device may be detected via the femtocell. Based on the detection, the femtocell may be configured to transmit and/or receive signals on one or more frequencies and/or channels. The one or more frequencies and/or channels may be determined in the femtocell and/or in a network management entity. Detecting interfering signals and configuring the one or more femtocells may occur periodically, upon installation of a femtocell, upon power-up of a femtocell, and/or upon command from a network administrator. The results of the detection may be communicated to one or more other femtocells and/or to a network management entity.

24 Claims, 7 Drawing Sheets

U.S. PATENT DOCUMENTS

| | | |
|---|---|---|
| 2010/0184423 A1 | 7/2010 | Kent et al. |
| 2010/0184450 A1 | 7/2010 | Chen et al. |
| 2010/0186027 A1 | 7/2010 | Hou et al. |
| 2010/0210239 A1 | 8/2010 | Karaoguz et al. |
| 2010/0220642 A1 | 9/2010 | Abraham et al. |
| 2010/0220692 A1 | 9/2010 | Diab et al. |
| 2010/0220731 A1 | 9/2010 | Diab et al. |
| 2010/0222054 A1 | 9/2010 | Abraham et al. |
| 2010/0222069 A1 | 9/2010 | Abraham et al. |
| 2010/0238836 A1 | 9/2010 | Diab et al. |

OTHER PUBLICATIONS

Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/406,835, filed Mar. 18, 2009.
Unpublished U.S. Appl. No. 12/395,436, filed Feb. 27, 2009.
European Search Report corresponding to European Patent Application No. 10001341.6-1244, dated Jul. 5, 2010.

METHOD AND SYSTEM FOR MITIGATING INTERFERENCE AMONG FEMTOCELLS VIA INTELLIGENT CHANNEL SELECTION

CROSS-REFERENCE TO RELATED APPLICATIONS/INCORPORATION BY REFERENCE

Not applicable

FIELD OF THE INVENTION

Certain embodiments of the invention relate to communication networks. More specifically, certain embodiments of the invention relate to a method and system for mitigating interference among femtocells via intelligent channel selection.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may have to be secured.

A handover mechanism between femtocells and between femtocells and one or more cellular provider's networks enables operation in private and public areas including indoor and outdoor environments. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example.

Femtocells need to be scalable, easily integrated, and robust enough to handle interference and support synchronization. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based lu-b interface, a session initiation protocol (SIP) based approach using an lu/A interface, use of unlicensed spectrum in a technique known as unlicensed mobile access (UMA) and/or use of IP multimedia subsystem (IMS) voice call continuity (VCC), for example.

In an lu-b model based femtocell deployment approach, femtocells may be fully integrated into the wireless carrier's network and may be treated like any other remote node in a network. The lu-b protocol may have a plurality of responsibilities, such as the management of common channels, common resources, and radio links along with configuration management, including cell configuration management, measurement handling and control, time division duplex (TDD) synchronization, and/or error reporting, for example. In lu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device. Further limitations and disadvantages of conventional and traditional approaches will become apparent to one of skill in the art, through comparison of such systems with some aspects of the present invention as set forth in the remainder of the present application with reference to the drawings.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided mitigating interference among femtocells via intelligent channel selection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for mitigating interference among femtocells via intelligent channel selection. In various embodiments of the invention, signals which may interfere with cellular communications between a femtocell and a cellular enabled communication device may be detected. Based on the detection, the femtocell may be configured to transmit and/or receive signals on one or more frequencies and/or channels. The femtocell may detect the interference signals by measuring, for example, received signal strength, SNR, SINR, and CNR. The one or more frequencies and/or channels may be determined in the femtocell and/or in a network management entity. Frequencies and/or channels determined in a network management entity may be communicated to the femtocell. Detecting interfering signals and configuring of the femtocell may occur periodically, upon installation of the femtocell, upon power-up of the femtocell, and/or upon command from a network administrator. Communication between the femtocell and the network management entity may be over an IP network. In various embodiments of the invention, the interfering signals may be detected via one or more of a plurality of femtocells. In such instances, the results of the detection may be communicated among the plurality of femtocells and/or with the network management entity.

Figure 1A:
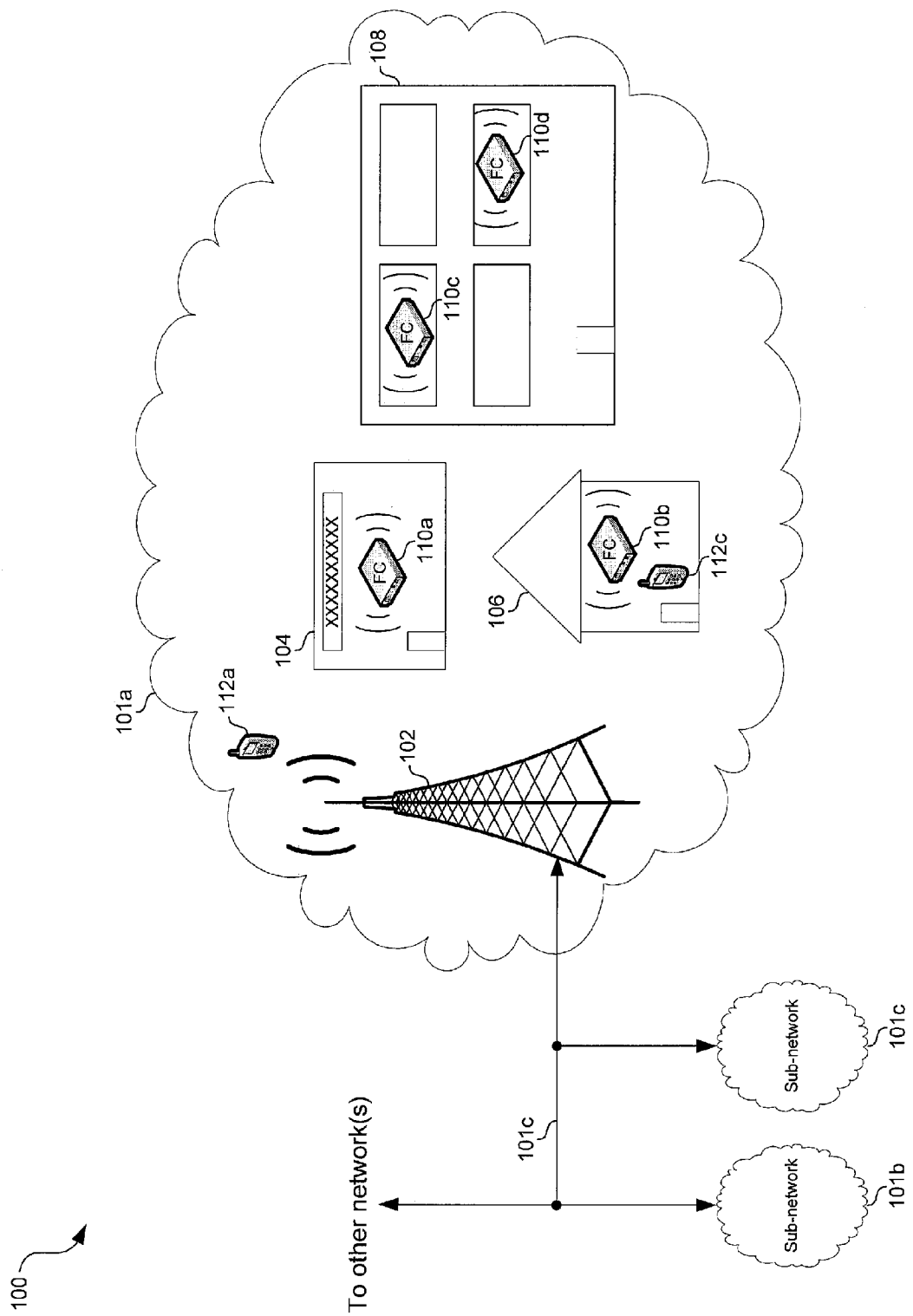
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a base station 102, femtocells 110a-110d, which are collectively referred to herein as femtocells 110, and cellular enabled communication devices 112a and 112c, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more cellular standards such as IS-95, CDMA, GSM, TDMA, GPRS, EDGE, UMTS/NCDMA, TD-SCDMA, HSDPA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/NCDMA, TD-SCDMA, HSDPA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over an IP network (not shown in FIG. 1A).

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication device may comprise laptop computers, mobile phones, and personal media players. The cellular enabled communication devices 112 may be enabled to receive, process, and present multimedia content and may additionally be enabled to run a network browser or other applications for providing Internet services to a user of the cellular enabled communication device 112.

In operation, the cellular enabled communication devices 112 may gain access to the cellular network 100 and/or to other communication networks via cellular communications with the base station 102 and the femtocells 110. In this regard, in instances that a reliable connection may be established between the base station 102 and a cellular enabled communication device 112, then data may be communicated between the cellular enabled communication device 112 and the base station 102. Alternatively, in instances that a reliable connection may be established between a femtocell 110 and a cellular enabled communication device 112, then data may be communicated between the cellular enabled communication device 112 and the femtocell 110. However, because of the finite number of cellular channels and limited availability and cost of licensing cellular frequencies, there may be a significant risk for interference between two or more of the femtocells 110 and/or between one or more femtocells 110 and the base station 102. Thus, owners and/or operators (owners/operators) of the femtocells 110 may desire and/or need a way to mitigate the cellular interference caused by the femtocells 110 in the cellular network 100.

Accordingly, aspects of the invention may enable characterizing an environment to detect interference and intelligently controlling a frequency and/or channel on which one or more of femtocells 110 transmit and/or receive cellular signals based on the detected interference. Intelligent control of frequencies and/or channels on which a femtocell transmits and/or receives may enable reducing and/or minimizing overlapping coverage areas of different femtocells and/or base stations operating on the same or closely spaced frequencies and/or channels.

Figure 1B:
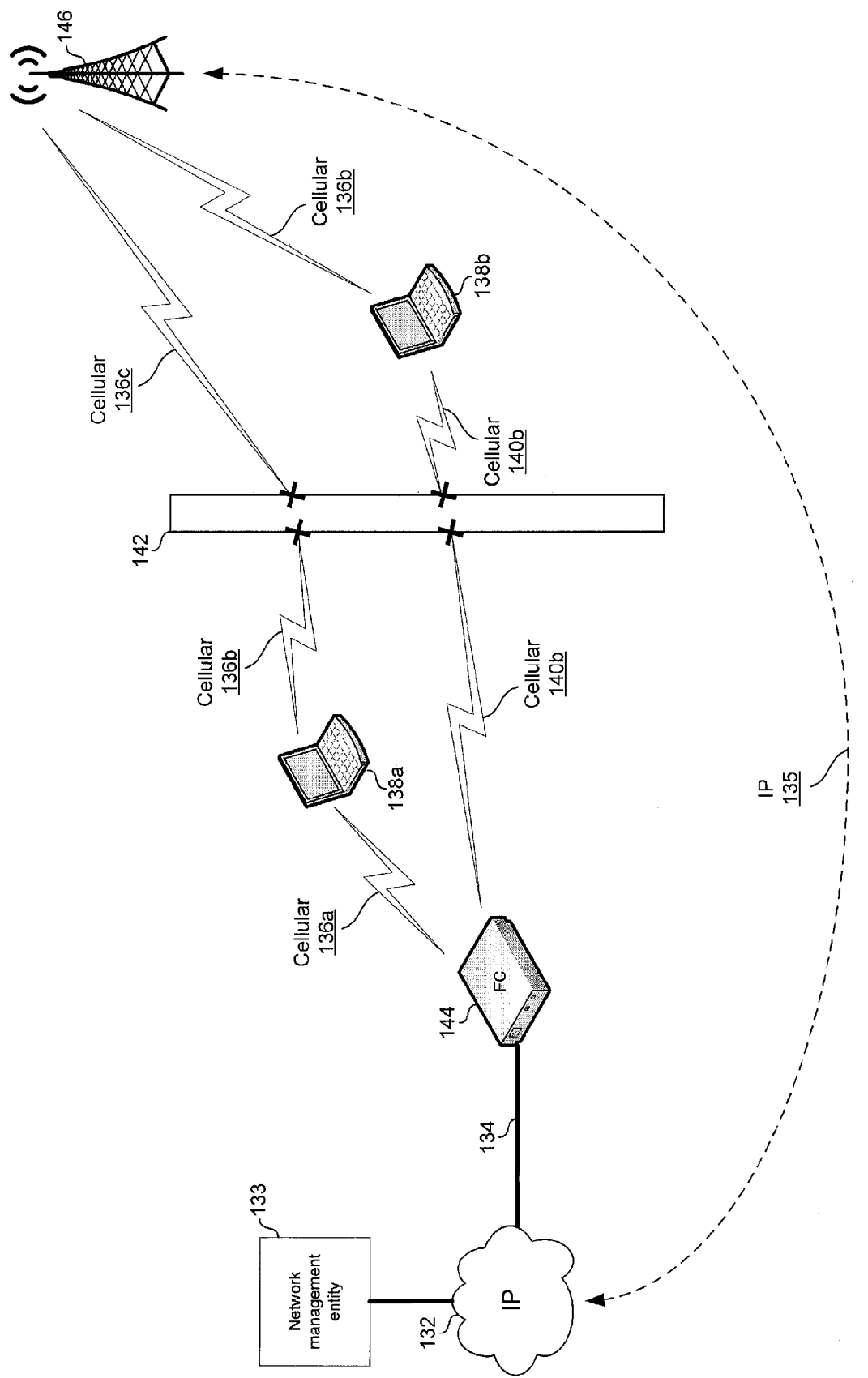
FIG. 1B is a diagram illustrating cellular communication with via a femtocell, in accordance with an embodiment of the invention.

FIG. 1B is a diagram illustrating cellular communication via a femtocell, in accordance with an embodiment of the invention. Referring to FIG. 1B, there is shown a femtocell 144, cellular enabled communication devices 138a and 138b, collectively referred to herein as cellular enabled communication devices 138, communication barrier 142, and base station 146. The femtocell 144 may be communicatively coupled to an IP network 132 via a link 134.

The base station 146 may be similar to or the same as the base station 102 described with respect to FIG. 1A. The cellular enabled communication devices 138 may be similar to or the same as the cellular enabled communication devices 112 described with respect to FIG. 1A. The femtocell 144 may be similar to or the same as the femtocells 110 described with respect to FIG. 1A.

The IP network 132 may comprise one or more network devices and/or network links operable to transmit and/or receive IP packets. The IP network 132 may provide access to the Internet and/or one or more private networks.

The network management entity 133 may comprise suitable logic, circuitry, and/or code that may be operable to receive results of environmental characterizations via one or more network links. The characterization may comprise detecting potential interfering signals. The network management entity 264 may determine frequencies and/or channels to be utilized by one or more femtocells based on the received information, and communicate the determination to the one or more femtocells.

The link 134 may comprise a broadband link such as a digital subscriber line (DSL), passive optical network (PON), Ethernet, a T1/E1 line, a cable television infrastructure, a satellite television infrastructure, and/or a satellite broadband Internet link. The link 134 may comprise one or more optical, wired, and/or wireless links.

The communications barrier 142 may comprise an obstruction to cellular communications. In some instances, the barrier 142 may comprise a physical barrier such as a building or mountainous terrain. In some instances, the barrier 142 may represent a distance which may be too great for reliable cellular communications. In some instances, the barrier 142 may represent interference or a limitation of channel capacity which may prevent cellular communications. The barrier 142 may prevent cellular communications between the base station 146 and the cellular enabled communication device 138a and may prevent cellular communications between the femtocell 144 and the cellular enabled communication device 138b.

In operation, the cellular enabled communication device 138a and the cellular enabled communication device 138b may communicate via the femtocell 144, the base station 146, and the IP network 132. For example, the cellular enabled communication device 138a may transmit data to the femtocell 144 utilizing one or more cellular standards. The femtocell 144 may packetize the data into one or more IP packets and the IP packets may be further encapsulated, encoded, modulated, or otherwise processed. The IP packets may then be routed via the IP network 132 to the base station 146. In some instances, the base station 146 may utilize IP backloading and the IP packets may be conveyed to the base station 146. In other instances, the IP packets may be transcoded via one or more network elements (not shown in FIG. 1B) to a format supported by the base station 146. The data may then be extracted from the IP packets, transcoded to a format suitable for cellular transmission, and subsequently transmitted to the cellular enabled communication device 138b. In this manner, the femtocell 144 may enable communication with the cellular enabled communication device 138a even in instances that the cellular enabled communication device 138a is unable to establish reliable cellular communications with a base station. Because the femtocell 144 and the base station 146 are separated by the barrier 142, they may operate on the same or closely spaced frequencies and/or channels without interfering with one another. However, if the barrier 142 were not present, interference may arise between the cellular signals from the femtocell 144 and the cellular signals from the base station 146. Accordingly, aspects of the invention may enable the femtocell 144 to characterize the environment in which it operates to enable detection of interference from the base station 146 or other sources and correspondingly adjusting a frequency and/or channel on which it operates. A new frequency and/or channel of operation of the femtocell 144 may be controlled to be spaced as far as possible from one or more frequencies and/or one or more channels utilized by the base station 146 and/or of one or more other neighboring femtocells and/or base stations.

Although, FIG. 1B describes communication between a pair of cellular enabled communication devices via a single femtocell and a base station, communication with other equipment via one or more femtocells and an IP network may be similar to the communication described with respect to FIG. 1A. In this regard, devices which may communicate via one or more femtocells may comprise cellular enabled communication devices in other sub-networks, cellular enabled communication devices in different cellular networks, conventional "landline" phones coupled to a PSTN, IP phones, and computing devices such as PCs and fileservers coupled to an IP network.

Figure 1C:
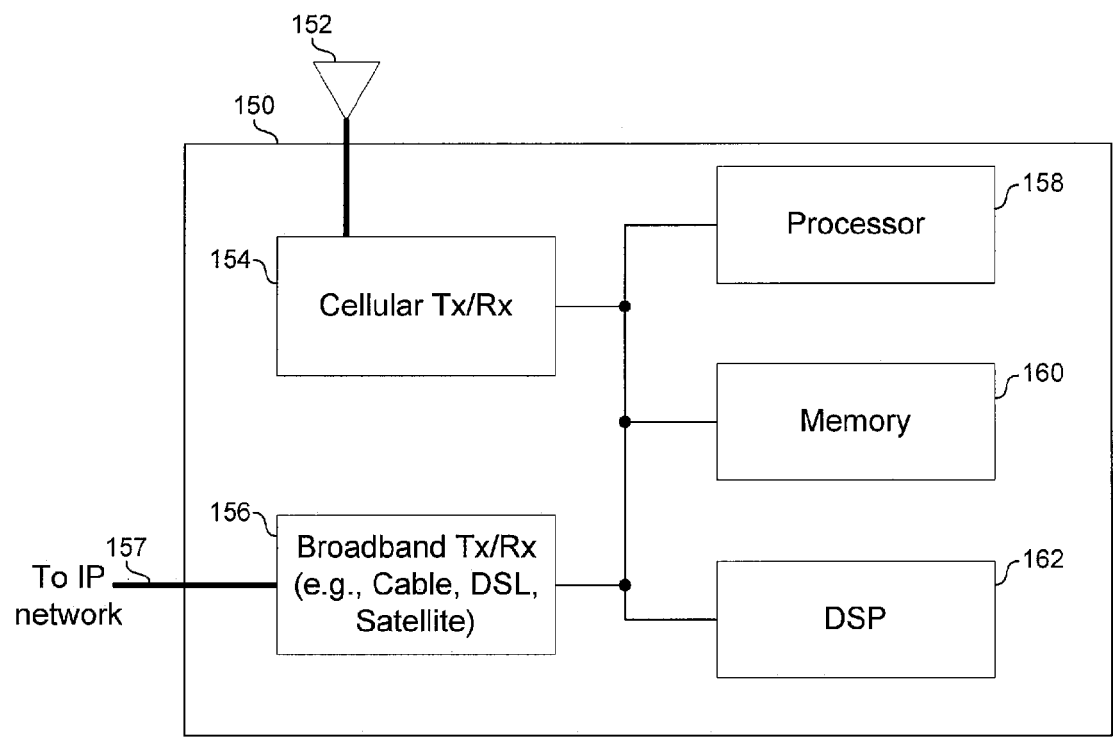
FIG. 1C is a diagram illustrating an exemplary block diagram of a femtocell, in accordance with an embodiment of the invention.

FIG. 1C is a diagram illustrating an exemplary block diagram of a femtocell, in accordance with an embodiment of the invention. Referring to FIG. 1C, there is shown a femtocell 150 comprising an antenna 152, a cellular transmitter and/or receiver (Tx/Rx) 154, a broadband transmitter and/or receiver (Tx/Rx) 156, a processor 158, a memory 160, and a digital signal processor (DSP) 162. The femtocell 150 may be similar to or the same as the femtocells 110 described with respect to FIG. 1B.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The cellular Tx/Rx 154 may be operable to transmit and/or receive on one or more frequencies and/or channels. One or more of the frequencies and/or one or more of the channels on which the cellular Tx/Rx 154 receives and/or transmits may be configured via one or more control signals from the processor 158, memory 160, and/or the DSP 162. The cellular Tx/Rx 154 may also comprise a received signal strength indicator for characterizing an environment in which the femtocell 150 resides.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, optical fiber, DSL, cable television infrastructure, satellite broadband internet connection, satellite television infrastructure, and/or Ethernet. In various exemplary embodiments of the invention, data received via the broadband Tx/Rx 156 may be conveyed to the processor 158, memory 160, and/or the DSP 162 and may be utilized to control one or more frequencies and/or channels on which the cellular Tx/Rx 154 transmits and/or receives.

The processor 158 may comprise suitable logic, circuitry, and/or code that may enable processing data and/or controlling operations of the femtocell 150. In this regard, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160. In various embodiments of the invention, the applications, programs, and/or code may enable detecting interference and/or controlling cellular one or more frequencies and/or one or more channels on which the cellular Tx/Rx 154 transmits and/or receives.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In various embodiments of the invention, the memory 160 may comprise one or more look-up tables utilized for determining cellular enabled communication devices within a coverage area of the femtocell 150. In various embodiments of the invention, the memory 160 may comprise one or more look-up tables or other data structures which may comprise information controlling one or more frequencies and/or one or more channels on which the cellular Tx/Rx 154 transmits and/or receives.

The DSP 162 may comprise suitable logic, circuitry, and/or code operable to computationally intensive processing. In various embodiments of the invention, the DSP 162 may encode, decode, modulate, demodulate, encrypt, and/or decrypt data. In various embodiments of the invention, the DSP 162 may be operable to detect interference and/or control one or more frequencies and/or one or more channels on which the cellular Tx/Rx 154 transmits and/or receives. The DSP 162 may be operable to perform, for example, fast Fourier transform analysis (FFT) of received signals to characterize an environment in which the femtocell 150 resides.

In an exemplary embodiment of the invention, the femtocell 150 may characterize its environment by receiving signals on one or more frequencies and/or channels via the cellular Tx/Rx 154, conveying the received signals to the DSP 162, and performing one or more measurements and/or calculations on the signals via the DSP 162. In this regard, the DSP may characterize received signals utilizing metrics such as in-band interference, out-of-band interference, and/or signal-to-noise ratio (e.g. SNR, SINR, CNR). The characterization may enable detection of interfering signals. Results of the characterization may be conveyed to the processor 158 and/or stored in the memory 160 and may be utilized, at least in part, to determine one or more frequencies and/or channels on which the cellular Tx/Rx 154 may transmit and/or receive. In this manner, interference may be reduced. The results of the characterization may be communicated over, for example, an IP network to which they and the femtocell 150 are communicatively coupled via the broadband Tx/Rx 156.

The one or more frequencies and/or channels on which the cellular Tx/Rx 154 may transmit and/or receive may also be determined, at least in part, based on data received via the broadband Tx/Rx 156. In this regard, other femtocells and/or base stations may characterize the environment in which they are operating and may communicate results of those characterizations over, for example, an IP network to which they and the femtocell 150 are communicatively coupled. In various embodiments of the invention, characterizing an environment may comprise measuring signal strengths on one or more frequencies and/or channels and perform one or more calculations and/or analyses utilizing the measurements. In this manner, signals which may interfere with cellular communications with the femtocell 150 may be detected.

In other embodiments of the invention, the femtocell 150 may communicate results of the characterization to a network management entity, such as the network management entity 133 described with respect to FIG. 1B. The network management entity may utilize the information received from the femtocell 150 to determine frequencies and/or channels on which the femtocell 150 should transmit and/or receive. Additional and/or alternatively, the network management entity 133 may utilize characterization results received from other base stations and/or femtocells to determine frequencies and/or channels on which the femtocell 150 should transmit and/or receive. In this regard, the other base stations and/or femtocells may have coverage areas that may potentially overlap with the coverage area of the femtocell 150.

Figure 2A:
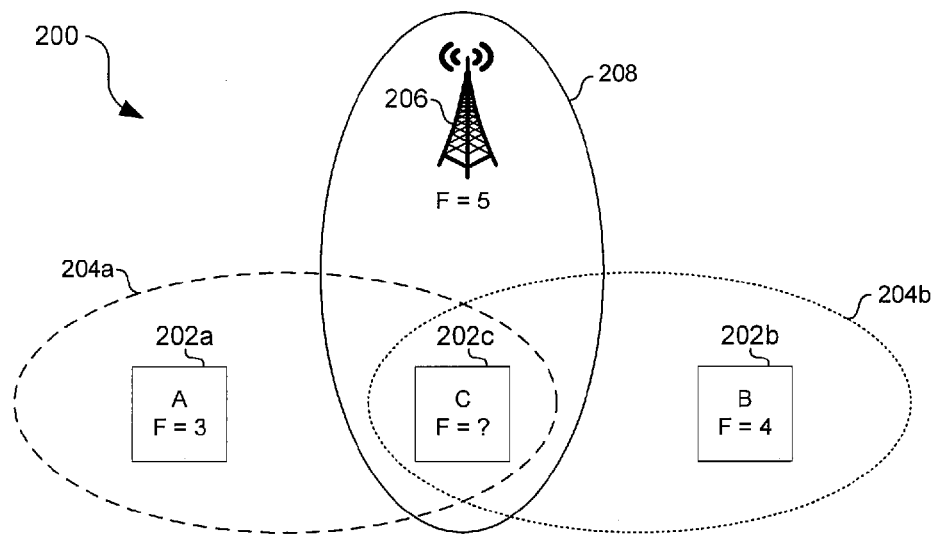
FIG. 2A is a diagram illustrating an exemplary cellular sub-network operable to utilize intelligent frequency and/or channel selection to reduce interference, in accordance with an embodiment of the invention.
Figure 2A:
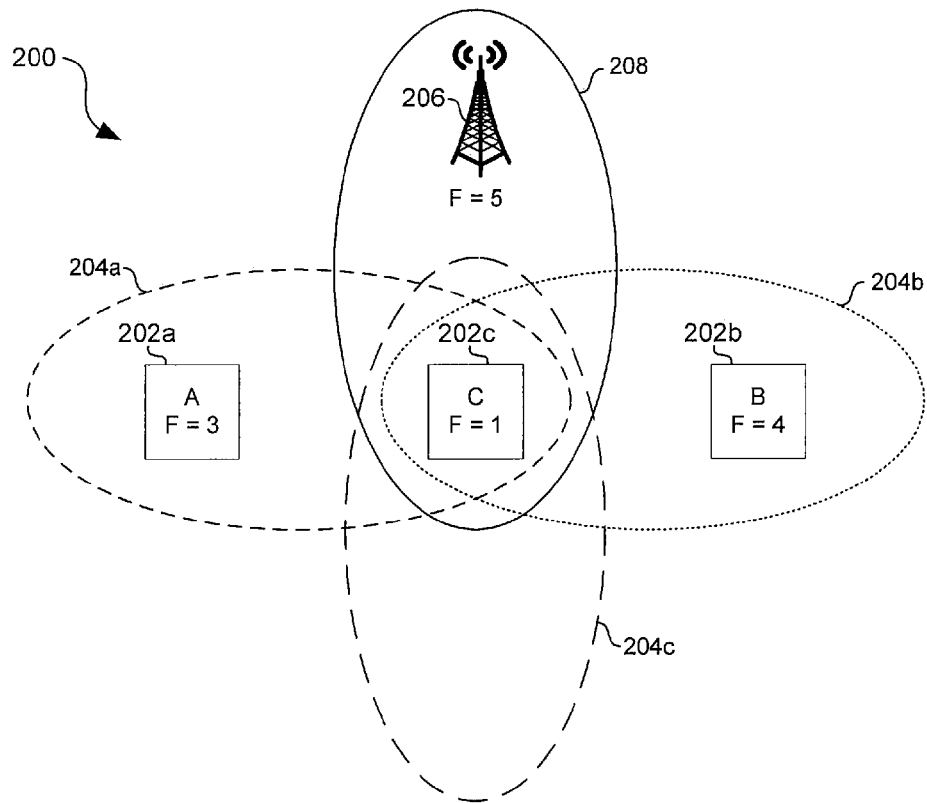

FIG. 2A is a diagram illustrating an exemplary cellular sub-network operable to utilize intelligent frequency and/or channel selection to reduce interference, in accordance with an embodiment of the invention. Referring to FIG. 2A, there is shown a sub-network 200 comprising a base station 206 and femtocells 202a, 202b, and 202c, collectively referred to as femtocells 202.

The base station 206 may be similar to or the same as the base station(s) 102 of FIG. 1A and/or the base station 146 of FIG. 1B. The base station 206 may have a coverage area 208, which although depicted as elliptical, is not limited with regard to a particular size, shape, or directionality.

The femtocells 202 may be similar to or the same as the femtocells 110 of FIG. 1A, the femtocell 144 of FIG. 1B, and/or the femtocell 150 of FIG. 1C. The femtocells 202a and 202b may have coverage areas 204a and 204b, respectively. Although the coverage areas 204a and 204b are depicted as being elliptical, the invention is not so limited. Accordingly, the coverage area 204a and 204b are not limited with regard to a particular size, shape, or directionality.

The top half of FIG. 2A shows the sub-network 200 prior to time instant T1 and the bottom half of FIG. 2A shows the sub-network 200 after time instant T1.

Prior to time instant T1, the femtocell 202c may not be transmitting cellular signals. In this regard, the femtocell 202c may, for example, have just been installed and/or powered up. However, prior to time instant T1, the femtocell 202c may measure received signal strength to characterize an environment in which it is operating. In this manner, the femtocell 202c may determine the potential of interference from other femtocells, base stations, and/or other sources. In this regard, in the exemplary sub-network 200, the femtocell 202c may be within the coverage area 208 of the base station 206, the coverage area 204a of the femtocell 202a, and the coverage area 204b of the femtocell 202b. The measured signal levels may be utilized to determine one or more frequencies and/or channels on which the femtocell may transmit and/or receive with tolerable levels of interference.

Subsequent to time instant T1, the femtocell 202c may begin providing cellular services. In this regard, after time instant T1 the femtocell 202c may be operable to communicate on the channels and/or frequencies determined prior to time instant T1 with one or more cellular enabled communication devices within its coverage area 204c. Although the coverage area 204c is depicted as elliptical, the invention is not so limited. Accordingly, the coverage area 204c is not limited to a particular size, shape, or directionality.

In an exemplary embodiment of the invention, there may be 5 frequencies available for cellular communication. The base station 206 may be communicating on frequency 5, the femtocell 202b may be communicating on frequency 4, and the femtocell 202a may be communicating on frequency 3. Accordingly, prior to time instant T1 the femtocell 202c may detect the frequencies being utilized and may determine that frequency 1 is the best frequency on which it should communicate in order to minimize interference with nearby devices. In this manner, the femtocell 202b may provide cellular service to cellular enabled communication devices within the coverage area 204c.

Figure 2B:
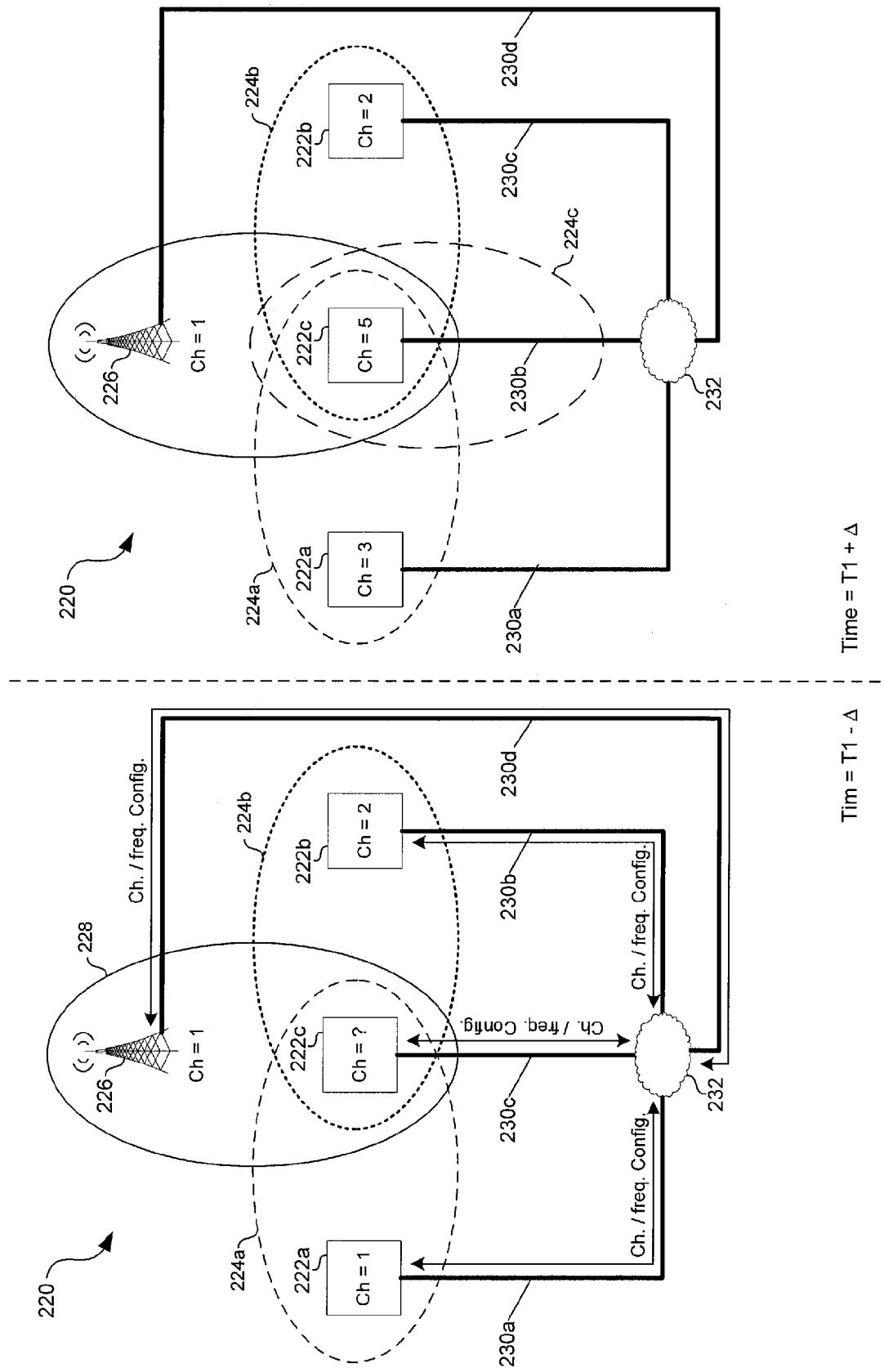
FIG. 2B is a diagram illustrating an exemplary cellular sub-network comprising one or more femtocells operable to utilize intelligent frequency and/or channel selection to reduce interference, in accordance with an embodiment of the invention.

FIG. 2B is a diagram illustrating an exemplary cellular sub-network comprising one or more femtocells operable to utilize intelligent frequency and/or channel selection to reduce interference, in accordance with an embodiment of the invention. Referring to FIG. 2B, there is shown a sub-network 220 comprising a base station 226 and femtocells 222a, 222b, and 222c, collectively referred to as femtocells 222. The femtocells 222 and the base station 226 may be communicatively coupled via network links 230.

The base station 226 may be similar to or the same as the base station(s) 206 of FIG. 2A. The base station 226 may have a coverage area 228, which, although depicted as elliptical, is not limited with regard to size, shape, or directionality.

The femtocells 222 may be similar to or the same as the femtocells 202 of FIG. 2A. The femtocells 222a and 222b may have coverage areas 224a and 224b, respectively. Although the coverage areas 224a and 224b are depicted as elliptical, they are not limited with regard to size, shape, or directionality.

The network links 230 may comprise wired or wireless links similar to or the same as the links 134 and 135 of FIG. 1B.

The left half of FIG. 2B shows the sub-network 220 prior to time instant T1 and the right half of FIG. 2B shows the sub-network 220 after to time instant T1.

Prior to time instant T1, the femtocell 222c may not be transmitting cellular signals. In this regard, the femtocell 222c may, for example, have just been installed and/or powered up. In the exemplary sub-network 220, the femtocell 222c may be within the coverage area 228 of the base station 226, the coverage area 224a of the femtocell 222a, and the coverage area 224b of the femtocell 222b. Prior to time instant T1, the femtocell 222c may characterize the environment in which it resides to detect potential interference from other femtocells, base stations, and/or other sources. Similarly, in addition to engaging in cellular communications, one or more of the femtocell 222a, the femtocell 222b, and the base station 226 may also characterize the environment in which they are operating to detect interfering signals from other femtocells, base stations, and/or other sources.

The results of the characterization may be communicated between two or more of the femtocell 222a, the femtocell 222b, the femtocell 222c, and the base station 226. In this manner, one or more of the femtocell 222a, the femtocell 222b, the femtocell 222c, and the base station 226 may utilize characterization results received from other nodes to determine which frequencies and/or channels on which to transmit and/or receive cellular signals. In various embodiments of the invention, the base station 226 and each of the femtocells 222 may be part of a hierarchy and frequencies may first be chosen to reduce interference at nodes higher up in the hierarchy and then, if possible, reduce interference at nodes that are lower in the hierarchy.

After time instant T1, the femtocell 222c may begin providing cellular services. In this regard, after time instant T1 the femtocell 222c may be operable to communicate with one or more cellular enabled communication devices within its coverage area 224c on the channels and/or frequencies determined prior to time instant T1. Although the coverage area 224c is depicted as elliptical, the invention is not so limited. Accordingly, the coverage area 224c is not limited to a particular size, shape, and/or directionality.

In an exemplary embodiment of the invention, there may be 5 channels available for cellular communication. The base station 226 may be communicating on channel 1, the femtocell 222b may be communicating on channel 2, and the femtocell 222a may be communicating on channel 1. In this regard, prior to time instant 1, there may be interference between the base station 226 and the femtocell 222a in places where their coverage areas overlap. Accordingly, prior to time instant T1, the femtocell 222c may detect that the base station 226 and the femtocell 222a are both communicating on cellular channel 1 and that the femtocell 222b is communicating on cellular channel 2. The femtocell 222c may communicate this information to the femtocell 222a and the base station 226. Consequently, additional messages may be communicated between the femtocells 222 and the base station 226 in order to determine a channel for each node to communicate on in order to optimize interference levels in the sub-network 220. For example, various in band and/or out-of-band (OOB) messages communicated between the various nodes 222 and 226 of the sub-network 220 may result in the femtocell 222a switching to channel 3 and the femtocell 222c operating on channel 5.

Figure 2C:
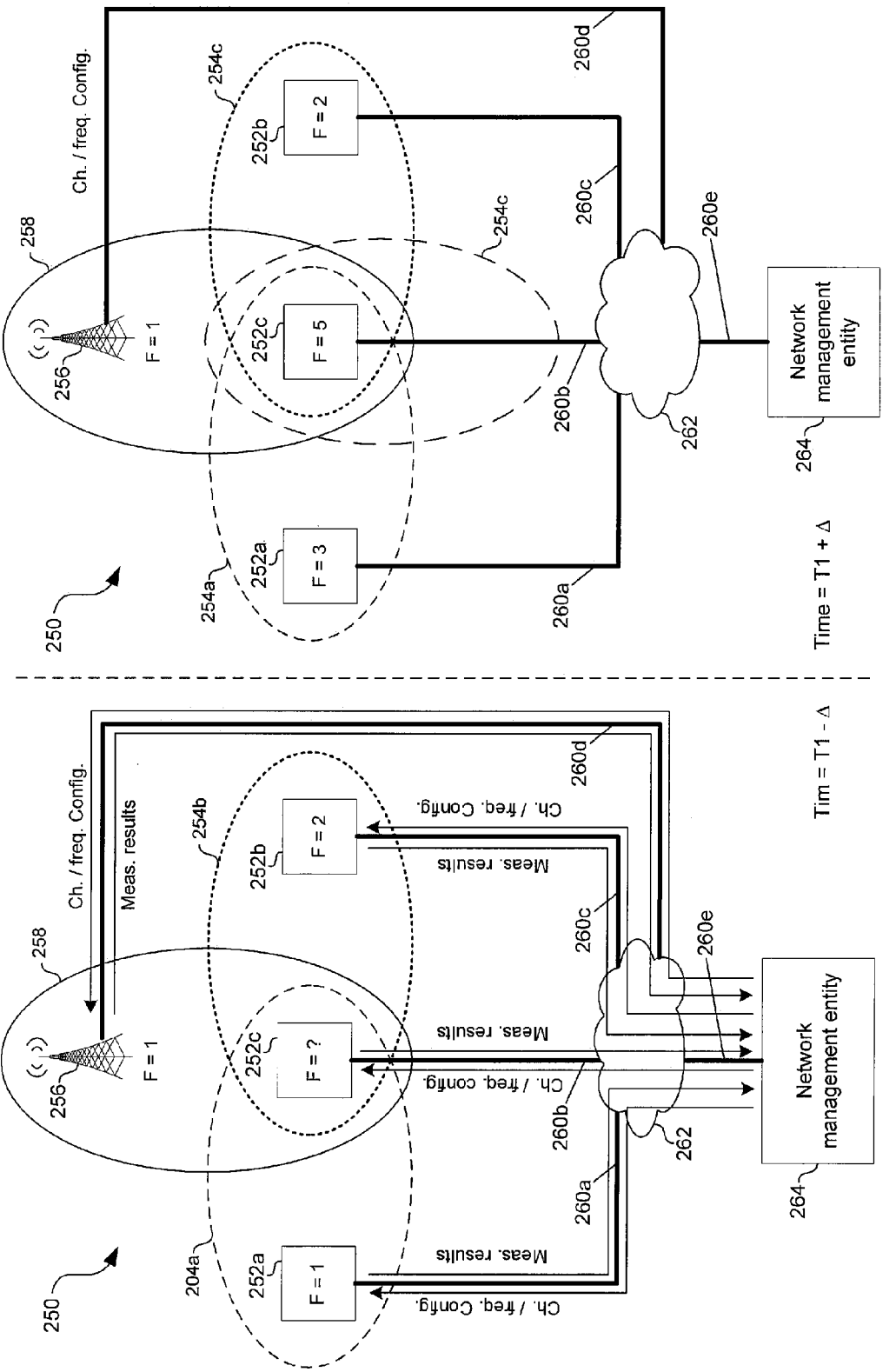
FIG. 2C is a diagram illustrating an exemplary cellular sub-network comprising femtocells operable to utilize intelligent frequency and/or channel selection to reduce interference, in accordance with an embodiment of the invention.

FIG. 2C is a diagram illustrating an exemplary cellular sub-network comprising femtocells operable to utilize intelligent frequency and/or channel selection to reduce interference, in accordance with an embodiment of the invention. Referring to FIG. 2C, there is shown a sub-network 250 comprising a base station 256 and femtocells 252a, 252b, and 252c, collectively referred to as femtocells 252. The femtocells 252 and the base station 256 may be communicatively coupled to a network management entity 264 via network links 260.

The base station 256 may be similar to or the same as the base station(s) 206 of FIG. 2A. The base station 256 may have a coverage area 258, which, although depicted as being elliptical, is not limited with regard to a particular size, shape, or directionality.

The femtocells 252 may be similar to or the same as the femtocells 202 of FIG. 2A. The femtocells 252a and 252b may have coverage areas 254a and 254b, respectively. Although the coverage areas 254a and 254b are depicted as elliptical, they are not limited with regard to a particular size, shape, or directionality.

The network links 260 may comprise wired or wireless links similar to or the same as the links 134 and 135, which are described with respect to FIG. 1B.

The network management entity 264 may be similar to or the same as the network management entity 133 described with respect to FIG. 1B.

The left half of FIG. 2C shows the sub-network 250 prior to time instant T1 and the right half of FIG. 2C shows the sub-network 250 after time instant T1.

In the exemplary sub-network 250, the femtocell 252c may be within the coverage area 258 of the base station 256, the coverage area 254a of the femtocell 252a, and the coverage area 254b of the femtocell 202b. Prior to time instant T1, the femtocell 252c may not be transmitting cellular signals. In this regard, the femtocell 252c may, for example, have just been installed and/or powered up. The femtocell 252c may measure received signal strength to characterize the environment and detect potential interference from other femtocells, base stations, and/or other sources. The femtocell 252b may communicate results of the characterization to the network management entity 264. Similarly, in addition to engaging in cellular communications, one or more of the femtocell 252a, the femtocell 252b, and the base station 256 may also characterize the environment in which they are operating and communicate results of the characterization to the network management entity 264.

The network management entity 264 may utilize signal measurements and/or information associated therewith from one or more of the femtocell 252a, the femtocell 252b, the femtocell 252c, and the base station 256 to determine frequencies and/or channels to be utilized by the various nodes. In this manner, the network management entity 264 may determine the frequencies and/or channels of operation for the various nodes 254 and 256 in order to minimize interference in the sub-network 250. In various exemplary embodiments of the invention, the base station 256 and each of the femtocells 252 may be part of a hierarchy and frequencies may first be chosen to minimize interference at nodes higher up in the hierarchy and then, if possible, reduce interference at nodes that are lower in the hierarchy. Other schemes may be utilized without departing from the spirit and/or scope of the invention.

Prior to time instant T1, the network management entity 264 may communicate the frequency and/or channel determinations to the various nodes, femtocell 222a, the femtocell 222b, the femtocell 222c, and the base station 226, of the sub-network 250. Each of the femtocells 222 may configure one or more channels and/or frequencies on which it transmits and/or receives cellular signals.

After time instant T1, the femtocells 222 may be configured and may begin providing cellular services. Thus, the femtocells 252a, 252b, and 252c may be operable to communicate with one or more cellular enabled communication devices within their respective coverage areas 254a, 254b, and 254c on the channels and/or frequencies determined prior to time instant T1. In this regard, the coverage areas 254a, 254b, and 254c are depicted as elliptical. Notwithstanding, the coverage areas 254a, 254b, and 254c are not limited with regard to a particular size, shape, or directionality.

In an exemplary embodiment of the invention, there may be 5 frequencies available for cellular communication. The base station 256 may be communicating on frequency 1, the femtocell 252b may be communicating on frequency 2, and the femtocell 252a may be communicating on frequency 1. Prior to T1, the femtocell 252a may communicate that it is operating on frequency 1 to the network management entity, the femtocell 252b may communicate to the network management entity that it is operating on frequency 2, and the base station 256 may communicate an indication to the network management entity to specify that it is operating on frequency 1. Additionally, each of the femtocells 252 and the base station 256 may also communicate signal measurements and/or information associated therewith to the network management entity 264. Accordingly, the femtocell 252c may detect that the base station 256 and the 252a are both communicating on cellular frequency 1 and it may communicate to the network management entity 264 that the base station 256 and the femtocell 252a are interfering with each other in at least a portion of their coverage areas. The network management entity 264 may utilize the information received from various nodes to reconfigure the femtocell 252 to operate on frequency 3 and for the femtocell 252c to operate on frequency 5.

Figure 3:
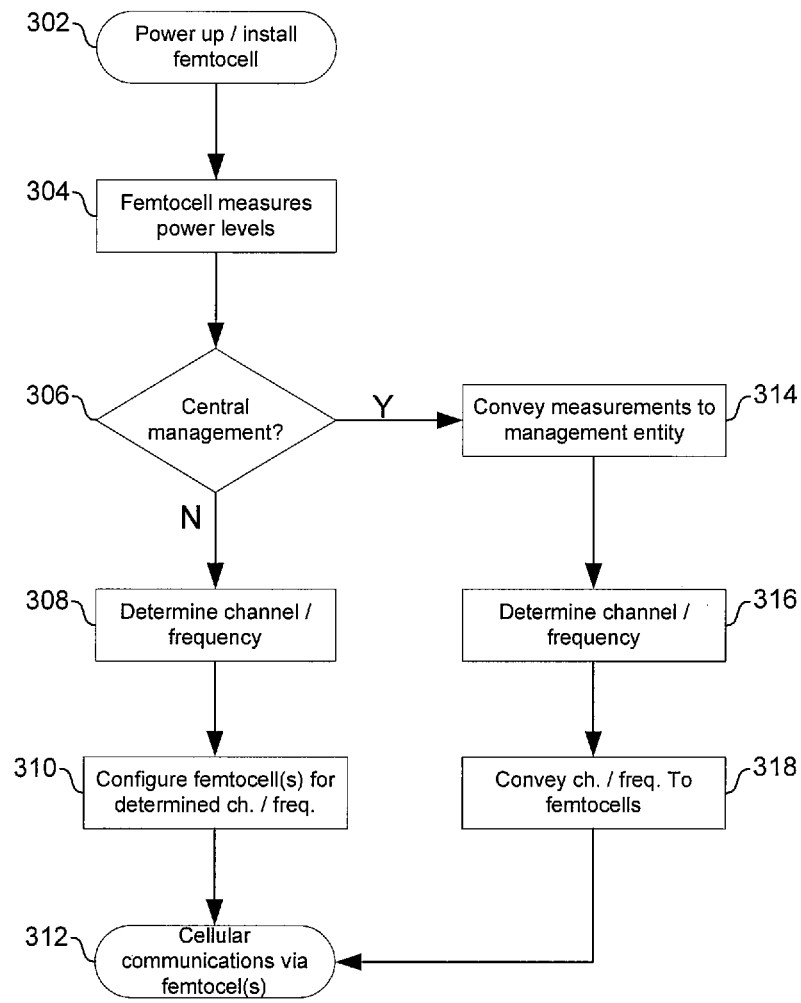
FIG. 3 is a flow chart illustrating exemplary steps for utilizing intelligent frequency and/or channel selection to reduce interference, in accordance with an embodiment of the invention.

FIG. 3 is a flow chart illustrating exemplary steps for utilizing intelligent frequency and/or channel selection to reduce interference, in accordance with an embodiment of the invention. Referring to FIG. 3, the exemplary steps may begin with step 302 when a femtocell may be installed and/or powered-up. In other exemplary embodiments of the invention, the exemplary steps of FIG. 3 may be performed periodically or on command from a network administrator. Subsequent to step 302, the exemplary steps may advance to step 304.

In step 304, the femtocell powered up in step 302 may characterize its environment in order to detect potential interference from other femtocells, base stations, or other sources. The femtocell may be similar to or the same as the femtocell 150 in FIG. 1C in that it may comprise a cellular Tx/Rx, a DSP, a memory, and a baseband processor for characterizing an environment in which it resides. In this regard, the femtocell 150 may measure signal strengths and perform one or more calculations and/or analyses utilizing the measurements. Subsequent to step 304, the exemplary steps may advance to step 306.

In step 306, it may be determined whether the femtocell is in a network managed by a network management entity. In instances that the network is not managed by a network management entity, the exemplary steps may advance to step 308.

In step 308, the femtocell may utilize the results of the characterization to determine one or more frequencies and/or channels on which it should transmit and/or receive cellular signals. In this regard, one or more frequencies and/or one or more channels may be chosen in an attempt to minimize interference with other femtocells and/or base stations. In some instances, the frequencies and/or channels may be chosen based in part on characterizations performed by other base stations and/or femtocells in the network. In this regard, the femtocell may be similar to the femtocell 150 of FIG. 1C in that it may comprise a broadband Tx/Rx enabled to communicate over non-cellular networks such as an IP network. Subsequent to step 308, the exemplary steps may advance to step 310.

In step 310, the femtocell may be configured to operate on the one or more frequencies and/or channels determined in step 310. For example, a processor, memory, and/or DSP of the femtocell may provide one or more control signals to configure a cellular Tx/Rx of the femtocell. Subsequent to step 310, the exemplary steps may advance to step 312.

In step 312, the femtocell may begin supporting cellular communications for one or more cellular enabled communication devices within its coverage area.

Returning to step 306, in instances that the network is managed by a network management entity, the exemplary steps may advance to step 314.

In step 314, the femtocell may communicate results of the characterization of step 304 to a network management entity. In this regard, the femtocell may communicate with the network management entity via a non-cellular connection such as an IP connection. Subsequent to step 314, the exemplary steps may advance to step 316.

In step 316, the network management entity may determine one or more frequencies and/or channels for femtocell to transmit and/or receive cellular signals on. In this regard, the frequencies and/or channels may be chosen so as to minimize interference with other femtocells and/or base stations. In some instances, the frequencies and/or channels may be chosen based, at least in part, on characterizations performed by other base stations and/or femtocells in the network. Subsequent to step 316, the exemplary steps may advance to step 318.

In step 318, the network management entity may communicate one or more messages to the femtocell indicating a frequency and/or channel for the femtocell to transmit and/or receive cellular signals on. Additionally, the network management entity may communicate one or more messages to other femtocells and/or base stations in the network informing them of the determination and/or indicating they should switch to a different frequency and/or channel.

Aspects of a method and system for mitigating interference among femtocells via intelligent channel selection are provided. In an exemplary embodiment of the invention, signals which may interfere with cellular communications between a femtocell 110a and a cellular enabled communication device 112 may be detected. Based on the detection, the femtocell 112 may be configured to transmit and/or receive signals on one or more frequencies and/or channels. The femtocell 112 may detect the interference signals by measuring, for example, received signal strength, SNR, SINR, and CNR. The one or more frequencies and/or channels may be determined in the femtocell 112 and/or in a network management entity 264. Frequencies and/or channels determined in the network management entity 264 may be communicated to the femtocell 112. Detecting interfering signals and configuring of the femtocell 112 may occur periodically, upon installation of the femtocell 112, upon power-up of the femtocell 112, and/or upon command from a network administrator. Communication between the femtocell and the network management entity may be over an IP network. In another embodiment of the invention, the interfering signals may be detected via one or more of a plurality of femtocells 222a-222c. In such instances, the results of the detection may be communicated among the plurality of femtocells 222a-222c and/or with the network management entity 264.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for mitigating interference among femtocells via intelligent channel selection.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
   detecting, within a femtocell, the presence of signals that will interfere with cellular communications between said femtocell and a cellular enabled communication device that communicates with said femtocell;
   measuring in-band interference, out-of-band interference, signal-to-noise ratio (SNR), signal to interference plus noise ratio (SINR), and carrier-to-noise ratio (CNR) of said signals received by said femtocell; and
   configuring said femtocell to transmit or receive cellular signals on a frequency or channel which is determined based on said detecting and measuring.

2. The method according to claim 1, further comprising measuring received signal strength on said frequency to detect the presence of said signals.

3. The method according to claim 1, further comprising measuring received signal strength on said channel to detect the presence of said signals.

4. The method according to claim 1, further comprising comprising determining said frequency or channel in said femtocell.

5. The method according to claim 1, further comprising determining said frequency or channel in a network management entity.

6. The method according to claim 5, wherein said frequency or channel is communicated from said network management entity to said femtocell.

7. The method according to claim 1, further comprising performing said detecting and configuring upon at least one of installing or powering up said femtocell.

8. The method according to claim 1, further comprising performing said detecting and configuring upon command from a network administrator.

9. The method according to claim 1, further comprising periodically performing said detecting and configuring.

10. The method according to claim 1, further comprising communicating results of said detecting via an IP network.

11. The method according to claim 1, further comprising detecting the presence of said signals via at least one of a plurality of femtocells.

12. The method according to claim 11, further comprising communicating results of said detection to a network management entity or among said plurality of femtocells.

13. A system for communication, comprising:
   a circuit for use in a femtocell configured to:
   detect the presence of signals which will interfere with cellular communications between a femtocell and a cellular enabled communication device that communicates with said femtocell;
   measure in-band interference, out-of-band interference, signal-to-noise ratio, (SNR), signal to interference plus noise ratio (SINR), and carrier-to-noise ratio (CNR) of said signals received by said femtocell; and
   configure said femtocell to transmit or receive cellular signals on at least one of a frequency or channel that is determined based on the results of said detection and measurement.

14. The system according to claim 13, wherein said circuit is further configured to detect the presence of said signals by measuring received signal strength on at least one frequency.

15. The system according to claim 13, wherein said circuit is further configured to detect the presence of said signals by measuring received signal strength on at least one channel.

16. The system according to claim 13, wherein said circuit is further configured to determine said at least one frequency or channel.

17. The system according to claim 13, wherein said at least one frequency or channel is determined in a network management entity.

18. The system according to claim 17, wherein said circuit is further configured to receive said at least one frequency or channel from said network management entity.

19. The system according to claim 13, wherein said circuit is further configured to perform said detecting and configuring upon installing or powering up said femtocell.

20. The system according to claim 13, wherein said circuit is further configured to perform said detecting and configuring upon initialization by a network administrator.

21. The system according to claim 13, wherein said circuit is further configured to periodically perform said detecting and configuring.

22. The system according to claim 13, wherein said circuit is further configured to communicate results of said detecting via an IP network.

23. The system according to claim 13, wherein said circuit is further configured to detect the presence of said signals via at least one of a plurality of femtocells.

24. The system according to claim 23, wherein said circuit is further configured to communicate results of said detection to a network management entity or among said plurality of femtocells.

* * * * *

UNITED STATES PATENT AND TRADEMARK OFFICE
CERTIFICATE OF CORRECTION

| | |
|---|---|
| PATENT NO. | : 8,442,544 B2 |
| APPLICATION NO. | : 12/395313 |
| DATED | : May 14, 2013 |
| INVENTOR(S) | : Abraham et al. |

It is certified that error appears in the above-identified patent and that said Letters Patent is hereby corrected as shown below:

On the Title Page, Item [75], "Inventors", reads "Los Gato" should read --Los Gatos--.

In the Claims:

In claim 4, column 15, line 31, reads "further comprising" should read --further--.

Signed and Sealed this
Second Day of July, 2013

Teresa Stanek Rea
*Acting Director of the United States Patent and Trademark Office*